March 31, 1964   A. PFEIFFER   3,126,730
AEROSOL CATCHER
Filed Jan. 18, 1963

INVENTOR
Albert Pfeiffer

BY

ATTORNEY

United States Patent Office 3,126,730
Patented Mar. 31, 1964

3,126,730
AEROSOL CATCHER
Albert Pfeiffer, Joppatown, Md., assignor to the United States of America as represented by the Secretary of the Army
Filed Jan. 18, 1963, Ser. No. 252,532
2 Claims. (Cl. 73—28)
(Granted under Title 35, U.S. Code (1952), sec. 266)

The invention described herein may be manufactured and used by or for the Government of the United States of America for governmental purposes without the payment to me of any royalty thereon.

This invention relates to a new type of aerosol analyzer which can accurately determine the number of particles in air even though the air is in motion at the time of sampling.

Prior methods utilize settling and impaction slides wherein these slides are positioned at different heights above the ground or floor situated at many points along the expected path of the traveling cloud. After exposure of the slides to the cloud, the particles on the slides have to be sized and counted, and from these data the size distribution and particle concentration in air are calculated. This method involves very large errors because the impaction efficiency cannot be determined with any degree of exactness. Moreover, our experiments show that the settling slides seldom show a true picture of the spectrum and concentration of particles in a cloud moving with the wind because a large percentage of the settling particles may be blown off the slide by the wind.

Another well known sampling method, utilizing a cascade impactor in connection with a critical orifice and a vacuum pump, gives accurate results only in case of isokinetic sampling which is extremely difficult to attain because the flow conditions of the wind are generally not known in sufficient detail.

In addition to above stated deficiencies of prior methods, it should be noted that it is practically impossible to get an analysis of the aerosol cloud for a very short period of time of the airflow, for example, $\frac{1}{10}$ to $\frac{1}{100}$ of a second. The sampling periods must be of longer duration in order to obtain results which have any statistical value. Because of this the sampling slides only show averages of the particle spectrum and concentration for a relatively large part of the passing cloud. Considering all of the disadvantages of known sampling methods, it is evident that engineers and scientists dealing with particulate clouds in motion have an urgent need for a sampling device which is not dependent on flow conditions and long sampling time periods. I believe that my sampling device is the answer in overcoming the above stated problems. My device can take accurate and statistically sufficient samples from any tranquille or turbulent aerosol cloud at any point and any time without any dependence upon flow conditions.

Figure 1:
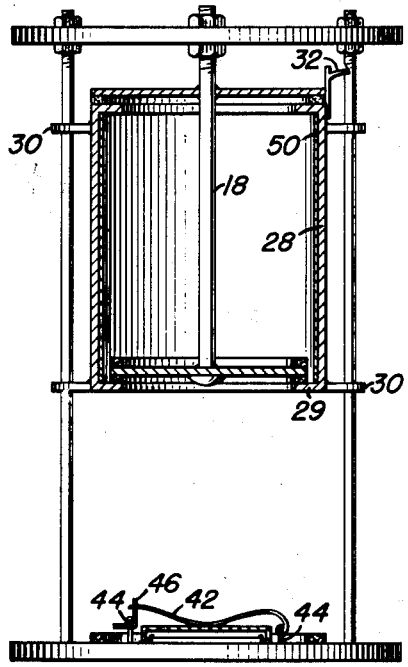
Figure 2:
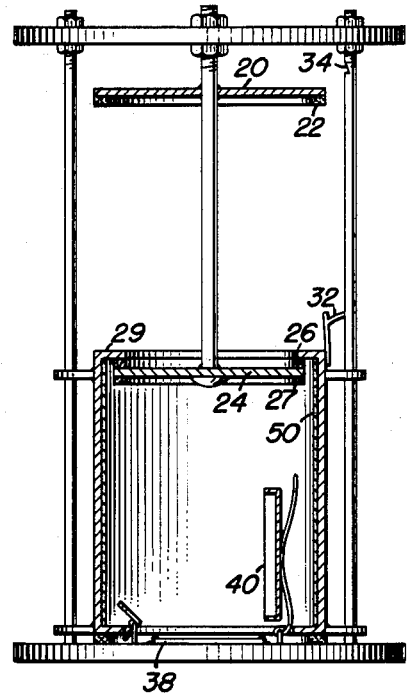

In the drawings, FIG. 1 shows a cross sectional view of the device in the open position; FIG. 2 shows the same device in the closed position; and FIG. 3 shows an isometric view of the device in the open position.

Referring now to the above figures, my device consists of a top member 10 and a bottom member 12 with supports 14 interconnecting between the top and bottom members. The supports may be attached to the top and bottom members by any suitable means, for example, screw threaded means 16. A center support bar 18 is connected to the top member at its center and extends downwardly approximately one-half the distance toward the bottom member. Permanently attached to the center support bar, adjacent to the top member is an upper closure plate 20 which has a cushioning and sealing material 22 attached to a portion of its underside. Permanently attached to the bottom of the center support bar 18 is a lower closure plate 24 which also has cushioning and sealing material 26 on its upper side and 27 on its lower side. A movable cylindrical container 28 is positioned below the upper closure plate 20 and extends downwardly below the lower closure plate 24 and has an inwardly projecting flange 29 at its upper and lower ends. These flanges engage the cushioning and sealing material when the catcher is in the open and closed position. The container has a plurality of guides 30 extending outwardly from its top and bottom and which surround the supports 14. A latch 32 is attached to the container at its upper end. The upper end of one of the supports 14 has been notched at 34. The latch can engage the notch in order to hold the catcher in the upward or open position. By releasing the latch from the notch the container will fall to its lower or closed position. When the container is in the upward or open position, the flange of the container is pressed against the cushioning and sealing material 22 and the lower flange is pressed against the cushioning and sealing material 27. When the container is released, the upper flange rests against the sealing and cushioning material 26 and the lower flange against the sealing material 36 which is positioned on the upper side of the bottom member. Also on the upper side of the bottom member and within the cushioning material is a settling slide 38. A lid 40 which covers the settling slide is attached to the middle of a tension spring 42 at its upper side. The tension spring has one end pivotally anchored to a bracket 44. The other end of said spring is releasably engaged with a slotted L shaped pivot release member 46 which is held by another bracket 44. A film lining 50 is fixed to the interior side walls of the container for catching particles that strike the sidewalls.

Figure 3:
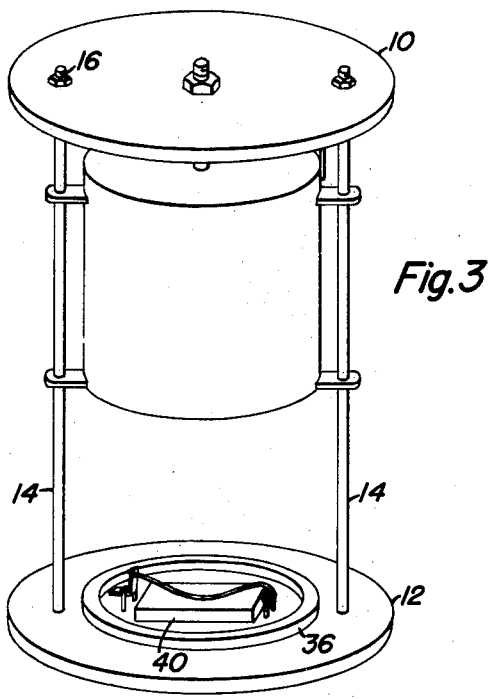

In operation, the device is set as shown in FIGS. 1 and 3, with the catcher in the upward or green position. The catcher is held by the engagement of latch 32 with notch 34. The wind is flowing below the container. When an air sample is desired the latch 32 is disengaged from the notch 34 allowing the container 28 to fall. The bottom flange 29 of the container strikes the bottom portion of the slotted L shaped pivot member thereby releasing the tension on the spring 42 which in turn raises the lid 40. This is but one of the many ways in which the lid can be raised, for example an electromagnet could easily be employed. The flanges of the container are resting on the cushioning and sealing material 26 and 36 so that none of the entrapped air can escape. When settling of the particles has occurred, the settling slides and film can be removed and an analysis can be made of their contents.

It is easily seen that by this method a small portion of the aerosol cloud is brought into an open container by a rapid relative movement of the container and the cloud to each other. The container automatically closes at the exact time when the particular portion of the cloud is desired to be caught. A settling slide which had been covered previously is now exposed to the aerosol in the now closed container. Impaction slides or films which can be attached to the inside of the wall of the container would also be exposed to the aerosol entering the container during the closing process. The settling and impaction slides may be removed and photographed, and the pictures obtained may be evaluated automatically or in a manual way. This is a simple, inexpensive device which is the answer to the problem of isokinetic sampling.

I claim:

1. An aerosol catcher comprising a top member and a bottom member with a plurality of supports between and connected to said members, a center bar attached to said top member, said center bar extending downwardly approximately one-half the distance to said bottom member, an upper closure plate and a lower closure plate attached to said center bar, a plurality of sealing and cushioning means attached to said closure plates, a container means slidably connected to said supports, said container having openings at its upper end and its lower end, said center bar extending through said upper end opening, said upper closure plate being positionined above said container for the effective sealing of the upper end opening, and said lower closure plate positioned within the container for effective sealing of the lower end opening when said container is in the upper position and for effective sealing of the upper opening when the container is in the lower position, releasable means to hold said container in the upper position, additional sealing and cushioning means attached to the upper side of said bottom member, a settling slide supported by said bottom member and surrounded by said additional sealing and cushioning means, a cover positioned over said settling slide, means attached to said cover and to said bottom member which when engaged by the falling container raises said cover in order to expose said settling slide.

2. The device of claim 1 wherein said container holds a film-lining around the interior side of its walls.

No references cited.